United States Patent [19]

Fayard et al.

[11] Patent Number: 4,670,225

[45] Date of Patent: Jun. 2, 1987

[54] APPARATUS FOR CONTINUOUSLY MAKING, IN DRY PHASE, EXOTHERMIC REACTIONS INVOLVING LIBERATION OF GAS, AND PRODUCTS OBTAINED, PARTICULARLY CALCIUM PHOSPHATES

[75] Inventors: Christian Fayard, Saint-Malo; Hubert de Villele, Vaucresson; Paul Gillet, Saint-Malo, all of France

[73] Assignee: Societe Anonyme Styled: S.A.E.TIMAC, Saint-Malo Cedex, France

[21] Appl. No.: 635,026

[22] Filed: Jul. 27, 1984

[30] Foreign Application Priority Data

Jul. 29, 1983 [FR] France ................ 83 12586

[51] Int. Cl.⁴ .............................................. B01J 8/10
[52] U.S. Cl. ................................... 422/203; 422/208; 422/225; 422/232; 422/235; 71/63; 423/308; 423/421; 55/340; 55/431
[58] Field of Search ............... 422/202, 203, 208, 225, 422/226, 232, 234, 235; 71/9, 34, 43, 63; 55/261, 339, 340, 431; 366/156

[56] References Cited

U.S. PATENT DOCUMENTS

| T955,002 | 2/1977 | Schultz et al. | 71/43 |
|---|---|---|---|
| 2,878,112 | 3/1959 | Morrison | 71/9 |
| 3,409,394 | 11/1968 | Sprigg . | |
| 3,467,495 | 9/1969 | Nielsson et al. . | |
| 4,032,319 | 6/1977 | Smith et al. | 71/34 |
| 4,184,269 | 1/1980 | Kneer | 71/9 |
| 4,249,929 | 2/1981 | Kneer | 71/9 |

FOREIGN PATENT DOCUMENTS

| 2723581 | 9/1978 | Fed. Rep. of Germany | 71/9 |
|---|---|---|---|
| 2186956 | 1/1974 | France . | |
| 2340905 | 9/1977 | France . | |

Primary Examiner—David L. Lacey
Attorney, Agent, or Firm—Millen & White

[57] ABSTRACT

Apparatus for continuously making products in dry-phase in an exothermic reaction includes a chamber having a mixer disposed at the bottom thereof with a reaction chamber above the mixer. First and second inlets are provided for introducing reactant materials into the reaction chamber at a position above the mixer. The mixer projects the solid particles into the reaction chamber in order to interact and produce the final product while an expansion chamber is provided above the reaction chamber for evacuating the resulting gas.

11 Claims, 2 Drawing Figures

APPARATUS FOR CONTINUOUSLY MAKING, IN DRY PHASE, EXOTHERMIC REACTIONS INVOLVING LIBERATION OF GAS, AND PRODUCTS OBTAINED, PARTICULARLY CALCIUM PHOSPHATES

BACKGROUND OF THE INVENTION

The present invention relates to a process and apparatus for making continuous exothermic chemical reactions between solid, liquid or gaseous products so as to obtain a final dry solid product having a (free water content less than 6% for inorganic products) with the following main characteristics:

(1) The reaction medium remains permanently in solid phase of dry appearance with a (solid in suspension in a gaseous medium, hence limiting any risk of soiling).

(2) At all times, the different products contained in the
reaction phase remain in proportions close to the stoichiometric conditions of the desired reaction, hence limitation of undesirable intermediate or parasitic reactions.

(3) The reaction carried out generally leads to the information, in addition to the desired solid product, of gaseous compounds such as water vapour, $CO_2$, etc., which contribute under the reaction conditions and to a large extent to the suspension and fluidization of the reaction mass.

(4) The additional mechanical energy for effecting this suspension is very low due to the considerable fluidity of the reaction mass.

(5) The reaction temperature is constant and may be taken to the desired optimal level, enabling stable reaction conditions and high reaction speeds to be obtained, and thus:
   by monitoring the flow rates of raw materials coming into reaction (this may be done by monitoring temperature since any variation in temperature in the reactors immediately indicates any variation of the flowrates and characteristics of the raw materials).
   by the initial choice of the exothermic level of the reactions chosen since different reactions of exothermicity may be carried out simultaneously in the reactor, for example: reaction of phosphoric acid with quick lime, simultaneously with the reaction of said acid with calcium carbonate.

(6) The apparatus further promotes the evacuation of the gaseous compounds obtained, consequently increasing tenfold the chemical balances in the desired sense.

The conditions of evacuation of the gases furnished, associated with stabilization of the operational parameters of the reactor, are such that they are easily adjusted in order:
   limit fly-off of solid materials;
   to allow them to be treated dry using a cyclone and bag filter, avoiding any loss of product, considerable corrosion, and pollution and thereby sequently simplifying the treatment apparatus.

(7) Taking the foregoing parameters into account, the reactor is of small dimensions employing small quantities of products, thus rendering heat losses low and giving an excellent thermodynamic yield. The cost of the raw materials is consequently optimalized.

For example: in the case of reacting an acid on a mixture of CaO and $CaCO_3$, the proportion of CaO, expensive raw material, is substantially reduced, while that of $CaCO_3$ is increased.

(8) The powders obtained have the advantage of being easy to granulate subsequently.

SUMMARY OF THE INVENTION

The instant invention contemplates an apparatus for carrying out continuously, and in dry phase, an exothermic reaction involving liberation of gas. The apparatus includes a reactor having a bottom wall and side walls extending up from the bottom wall to a top wall. This defines a lower reaction chamber and an upper expansion chamber located above the lower reaction chamber and in communication therewith. A high efficiency mixer is located within the lower reaction chamber at a level intermediate the bottom wall and a lower part of the expansion chamber. The mixer has projecting shears thereon. An inlet for introducing continuously at least one solid compound, which is to be reacted in said reaction chamber is provided at a level above the mixer. Consequently, at least one solid compound is projected upwardly by the mixer and atomized in the reaction chamber. A second inlet is provided for introducing continuously at least one other reacting compound into the reaction chamber at a level above the first inlet and in close proximity to the lower part of the expansion chamber so as to produce in the reaction chamber an atomized solid reaction product and an evolved gas at a level above the mixer. A recovering device for recovering the solid reaction product is positioned at the bottom of the reaction chamber and an exhaust is provided for exhausting the reaction gas in the vicinity of the top of the expansion chamber.

BRIEF DESCRIPTION OF THE DRAWINGS

The invention will be more readily understood on reading the following description with reference to the accompanying drawings, in which.

DESCRIPTION OF THE PREFERRED EMBODIMENT

Figure 1:
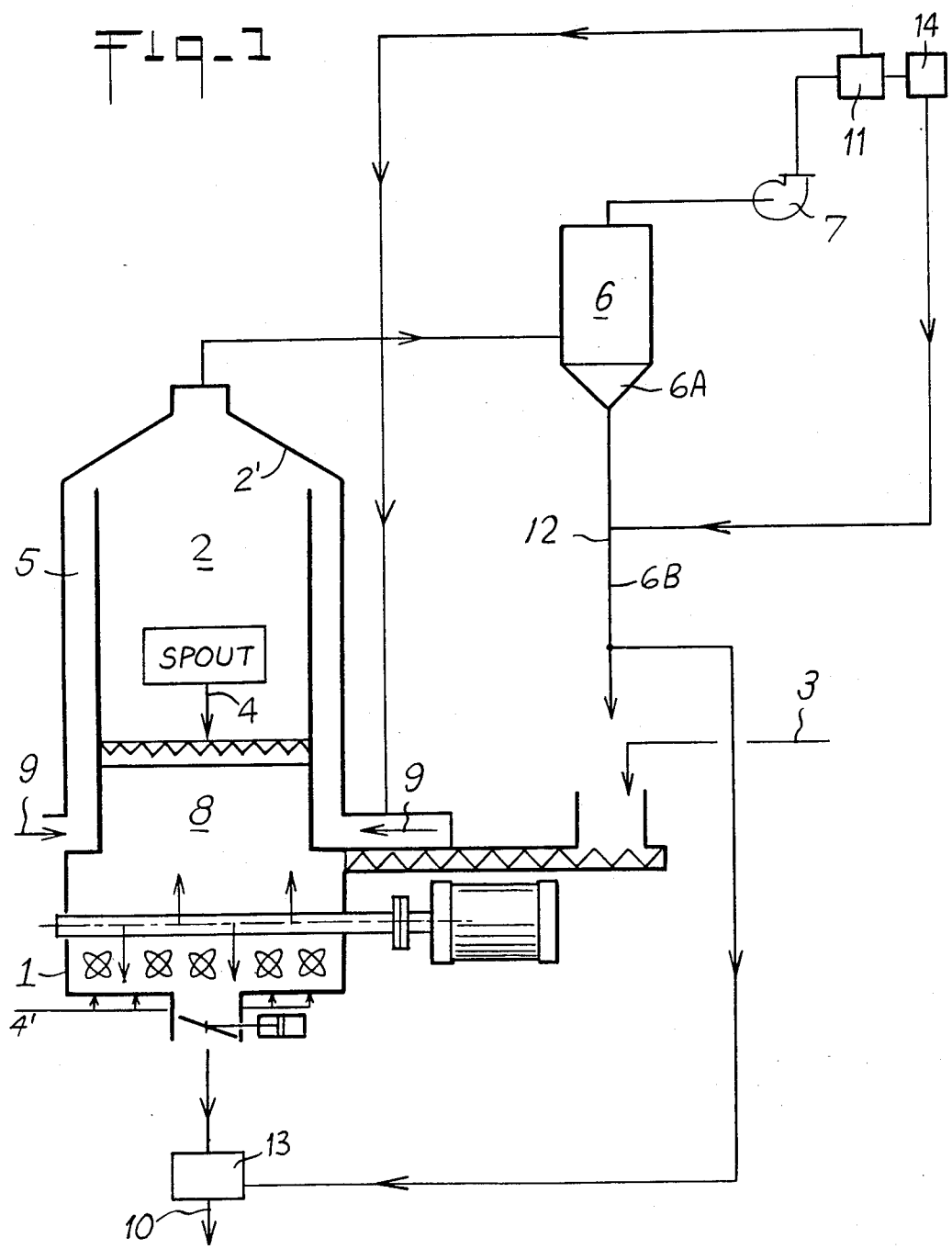
FIG. 1 shows a preferred embodiment of the apparatus according to the invention.

The references have the following meanings:

1—High-efficiency mixer which is cylindrical and incorporate shares.

2—Expansion chamber having an upper wall 2' which is the top of the reactor.

3—Introduction of raw materials

4—Spout for introducing and distributing the starting liquid products. When phosphoric acid or a reactive liquid in general is introduced, this spout forms a sort of channel of which one of the edges is cut out in the form of saw teeth, this allowing a regular overflow of the liquid over the length of the mixer 1.

4'—Flow line for introducing gaseous or liquid raws materials such as $NH_3$, for example.

5—Annular chamber for introducing a dilution gas when necessary, particularly air.

6—Recuperator of particles, for example, a bag having a downwardly conveying portion 6A connected to a line 6B for recycling particles recovered in the recuperator.

7—Extracting fan.

8—Zone having a bottom wall 8' which is the bottom of the reactor where the reaction between the first reagent or reactive mixture in powder form, projected upwardly by the mixer 1, and the gaseous or liquid agent introduced by the device 4', is continuously produced.

9—Introduction of the dilution gas, preferably heated.

10—Extraction of the finished product.

11—Recuperator of heat which is transmitted to the gas intended for dilution.

12—Recycling of dust.

13—Device for adding dust to the finished product

14-Dust collector downstream of recuperator 11

Operation of the apparatus, as well as its principal advantages, will be discussed within the framework of the reaction of phosphoric acid on lime, CaO, and/or calcium carbonate, $CaCO_3$.

DESCRIPTION OF THE POSSIBLE REACTIONS

It may be envisaged to prepare a very large number of products. On reading the present specification and embodiments, the man skilled in the art may easily apply the invention to reactions other than those described here by way of example. Particular products have been obtained according to the invention by combining the following raw materials:

A

Industrial phosphoric acid
Industrial phosphoric acid, desulfated, defluorinated
Sulfuric acid

B $NH_3$ liquefied to gas
CaO, quick lime
MgO, caustic magnesia
NaOH in solution

C

Calcium carbonate
Magnesium carbonate
Dolomite
Carbonate of soda
Bicarbonate of soda
Phosphate of natural lime Possible combinations between AB, AC and ABC so as to obtain:

(1) Products intended for animal feed
Mono-dicalcium phosphate
Dicalcium phosphate
Magnesium phosphates
Calcium-magnesium phosphates
Calcium-sodium-magnesium phosphates.

(2) Products intended for fertilization
Magnesium phosphates
Calcium-magnesium phosphates
Ammoniacal phosphates
Calco-magnesium sulfo-phosphates
Ammoniacal sulfo-phosphates It is obvious that a considerable number of products can be made in the apparatus according to the invention; only the principal uses studied up to the present will be retained here.

(1) the reaction of lime, CaO, and of calcium carbonate, $CaCO_3$, on phosphoric acid which produces, in known manner, mono- and dicalcium phosphates.

the dicalcium phosphates manufactured in this manner are essentially intended for animal feed, and the qualities of the raw materials are suitably selected to comply with the standards of the finished products.

In one of the known processes, BASLINI, high-capacity mixers of 25 $m^3$ for example, are employed, in particular, in which reaction is carried out in successive steps, and slowly on the order of 6 hrs.; consequently, the hourly yields by volume are low, as well as the thermal yields.

(2) The reactions of caustic calcined magnesia, MgO, and magnesium carbonate, $MgCO_3$, and/or Dolomite, $CaCO_3 (1-x)Mg(x)$, so as to obtain an original magnesium product, constituting a new form of magnesium derivative in powder form, whose formula is thought to be:

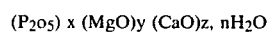

$$(P_2O_5)x \; (MgO)y \; (CaO)z, \; nH_2O$$

in proportions not yet defined.

The products manufactured in this manner may be used in two domains:

A—Fertilizers

In this domain, the man skilled in the art knows that, at the present time, two forms of Mg are mainly used in the domain of fertilizers:

(a) magnesium not or very weakly soluble in water:
Dolomite
$MgCO_3$
$Mg(OH)_2$
Caustic MgO
Dounite
Serpentinite, etc..

(b) water-soluble magnesium:
Sulfate of Mg
Chloride of Mg.

Forms whose agronomic efficiency may be limited in case of products "a" on certain types of soils such as neutral or alkaline soils. Or which bring problems of use in manufacture such as difficulty of granulation, losses of raw materials, limitation of the doses of use for the products of range "a".

parasitic reactions between the magnesium and the other components of the fertilizer for form "b" due perhaps to blockage of elements N, $P_2O_5$, MgO in the manufacture of complex NPK fertilizers by formation of ammoniacal magnesium phosphate, a salt which is particularly insoluble.

Under these conditions, the man skilled in the art knows that fertilizers comprising more than 5% of MgO are difficult to obtain.

Surprisingly, the apparatus according to the invention and the corresponding process make it possible to obtain a novel form of product bringing the Mg which may be classified as:

"magnesia soluble in neutral ammonium citrate" which is a solution constituting a standardized test for classification of the phosphated fertilizers, with solubility in water;

$P_2O_5$ bonded with the magnesium in this same product likewise being soluble in the neutral citrate.

In this form, the magnesium, although weakly soluble in water, may be considered as assimiliable from the agronomical standpoint, consequently considerably limiting the servitudes of use, i.e., servitudes of the soil pH.

It may also be used:
as such, as it is easy to granulate, or as raw materials in the manufacture of granulated fertilizers, and this at high doses, without problem of subsequent reactions or of granulation.

It thus becomes possible for the first time to manufacture P, NP, PK and NPK fertilizers with a high MgO content up to about 30% of MgO.

Moreover, it is possible to add addition products such as colemanite into the reactor, without a major drawback, making it possible to obtain products bringing in addition the element boron, and this without problem of subsequent granulation.

The invention therefore opens up new channels in the domain of fertrilizers.

B—Animal Food

In this domain, the man skilled in the art knows that one of the means mainly used at present for contributing the elements P, Ca, Mg in animal feed, is to bring P and Ca separately in the form of tri-calcium phosphate, generally defluorinated, and/or mono-dicalcium phosphates, and magnesia in the form of calcined MgO.

Certain products of this family have the advantage of bringing these same elements in an economical form once, in a concentrated combination, which does not pose the problems encountered with the use of MgO due to heating degranulation, transfer of humidity in the bags where the magnesium seems to be better used by the animal due to better efficiency of use by the animal.

There again, the invention therefore opens up new channels in the domain of animal feed.

(3) the reaction of magnesia, MgO, and/or Dolomite and ground natural phosphate with sulfuric acid and/or phosphoric acid.

Under these conditions, products are obtained, in which:

the $P_2O_5$ is in three forms:
water-soluble
Citrate soluble
Soluble in inorganic acids
the magnesia is in three forms:
Water-soluble
Citrate-soluble
Water insoluble The products consequently have three levels of activity.

The products are easy to granulate as such or mixed with for example potassium chloride (manufacture of PK fertilizers).

| Example Of Percentage Of Product Obtained | | | | | |
|---|---|---|---|---|---|
| $P_2O_5$ | Total | 18 | MgO | Total | 8 |
| | Citrate soluble | 10 | | Citrate soluble | 6 |
| | Water-soluble | 7 | | Water soluble | 2 |

(4) The reaction of magnesia (MgO), of Dolomite, of caustic soda, NaOH, with phosphoric acid.

The original products obtained according to the invention ,probably respond to the following form:

$(P_2O_5)v \ (MgO)x \ (CaO)y \ (Na_2O)z, nH_2O$ or more generally $P_2O_5 \ (MO)m, nH_2O$ where M may be $Ca^{++}$, $Mg^{++}$ or $Na^{++}$ or a mixture of 2 or 3 of these ions with, however, as limits:

$6\% < P_2O_5 < 60\%$

The following products were thus obtained:

| | Product 1 | Products 2 |
|---|---|---|
| $P_2O_5$ | 41.6 | 41.2 |
| CaO | 33.5 | 15.8 |
| $Na_2O$ | 5.4 | 4.5 |
| MgO | 1 | 7.2 |

These products find application in:
the domain of special fertilizers with sodium
the domain of animal feed.

GENERAL MODUS OPERANDI ILLUSTRATED BY THE MANUFACTURE OF DICALCIUM PHOSPHATES

The solid raw material of materials, in the form of ground powder, for example lime and/or calcium carbonate, are continuously introduced, after precise dosage by any appropriate system, in a cylindrical, so-called high-efficiency mixer 1, incorporating plough shares, fitted with a sufficient quantity of dispersers, which may be found on the market.

A distribution spout 4 is installed in chamber 2 for uniformly distributing phosphoric acid, of which the flow rate is known precisely by any conventional apparatus, over the whole length of the mixer. The spout is positioned so as not to be soiled by projections of powders; a special system of fixation has been designed to position it so that the acid drops optimally onto the reaction mass. This spout is preferably located in the lowermost meter of the chamber 2.

The originality of the chamber is that the products projected sufficiently high therein, due to the violent stirring provided by the mixer, atomize in contact with the phosphoric acid and degas perfectly well. Furthermore, its calculated dimensions avoid a maximum of fly-offs, according to Stockes' laws.

The reaction gases, water vapour and carbon dioxide, taken by the exothermicity of the reaction to high temperature of between 80° and 160° C., are drawn into a calculated Venturi system at the of the expansion chamber, after having been diluted by reheated air from an exchanger recovering the thermicity and in particular the heat of condensation of the water vapour being exhausted, or any other source of heat, such as the inevitable vapour that may be found on industrial sites. The volumes, flowrates and temperatures of the gas streams are arranged so as to operate in dry phase. In the system carried out, the hot air of dilution is conducted, uniformly distributed, through annular chambers 5 from bottom to top, in order to have a good insulation and to avoid any condensation on the walls, hence a perfectly clean system. Any other means for maintaining temperature such as vapour or electric tracing may be retained.

The gaseous mixture is conducted towards an apparatus 6 for recovering particles, for example a bag filter, before being ejected to the free air or into the exchanger mentioned above. The gaseous movement is entrained and controlled by a fan 7 located after the filter.

The very fine, dry dust collected by the recovery apparatus is reintroduced with the solid raw materials, or poured directly into the finished product.

Consequently, there is no wet washing of the gases, therefore, no problems of pollution.

It is obvious that the system should be perfectly heat-insulated by any known means.

A capital advantage of the invention is that operation is carried out entirely in dry phase. This is possible, in particular, as far as dust recuperation is conerned, thanks to the introduction of the hot dilution gas. Among other advantages, the considerable servitudes of wet washing of the gases due to pollution and very large dimensions are thus avoided.

During operation, the filter proved to remain clean and, on the other hand, had very little dust to stop.

Another essential advantage of the invention is that the reaction can run continuously, this enabling it to be monitored precisely at any moment by measuring, for example, the parameter of temperature of the gases in chamber 2.

The reaction mixture never passes beyond a pasty state and the quantities of gas emitted are constant as a function of time.

At no point in the reaction is the product contained in the mixer in wet phase, this due to the ratios between the raw materials. Stirring in the mixer being highly efficient, it is to be considered that the product is totally homogeneous and that it is therefore possible to continuously evacuated the calcium phosphate formed in order to maintain a rate of filling of the mixer of between 35 and 50% by volume.

The process described presents the advantage of an excellent ratio of volume of equipment for a high yield of finished product, this being due to the invention itself, namely that the mixture, the reaction itself and degassing are effected immediately in the bottom of the expansion chamber, in the form of atomization, degassing not having to be effected through the mass contained in the reactor. The finished products are consequently very fine.

For the reactor of 666 1(1 t/hr.), 1.8 t/m$^3$.hr. are attained according to the invention, whilst in the known systems operating discontinuously in vessels of 25 m$^3$, at 2 t/hr., only 0.088 t/m$^3$ are obtained.

The present process is further noteworthy by the low energy consumption because the weak consistency of the reaction medium allows a violent, low energy-consuming stirring and, on the other hand, the exothermicity of the reaction and the sources of energy in situ participate in the energy balance and may ensure self-sufficiency of the equipment. The very small dimensions of the production unit with respect to heretofore known workshops for manufacturing these products is also noteworthy. The yield is good, given that the losses of finished products are strictly limited to the ultra-fine particles able to pass the gas filtration media.

This installation is easy to render automatic, this much simplifying supervision thereof.

The phosphoric acid used has a titer of between 40 and 54% of $P_2O_5$. This acid must be of quality suitable not the running of the process but for conformity with the standards of use of the finished product.

The raw materials used in a ratio defined according to the titer of the acid, the reactivity of the raw materials and the desired calcium phosphate, must be of good quality, namely with high titer and of suitable fineness.

The following Examples illustrate the invention without, however, limiting the scope thereof.

EXAMPLE 1

Dicalcium Phosphate

Per hour of operation, distributed continually over this period of time 280 kg of quick lime with 95.2% of CaO, 125 kg of calcium carbonate with 97.4% of $CaCO_3$ or a $CaO/CaCO_3$ ratio =2.24, are introduced in the form of a mixture of powders in the reactor (2), and 882 kg of purified phosphoric acid, with 47.2% $P_2O_5$ and at 40° C., are poured over the projected reaction mixture, the whole apparatus operating continuously. A ton of finished product, dicalcium phosphate, is continuously extracted during this same period. The temperature of the mixture is 92° C.

A reactor of 666 1 is used, provided with an expansion chamber 4 m high, the gaseous system being put into motion by a 3000 Nm$^3$/hr. fan.

The dicalcium phosphate obtained titers 41.6% $P_2O_5$ total of which 40.1% $P_2O_5$ soluble in water+neutral citrate, 41.4% in 2% citric acid, Gueguen, 39.2% CaO. The product a humidity of 2% (4 hrs. at 105° C.) and a pH (10%) of 6.

White product, of fineness less than 50 , perfectly fluid.

Modifications limited in the conditions of exploitation of the reactor make it possible to obtain a micro-granulated product with mini d of 100 to maxi d of 1500.

EXAMPLE 2

Magnesium Products

Figure 2:
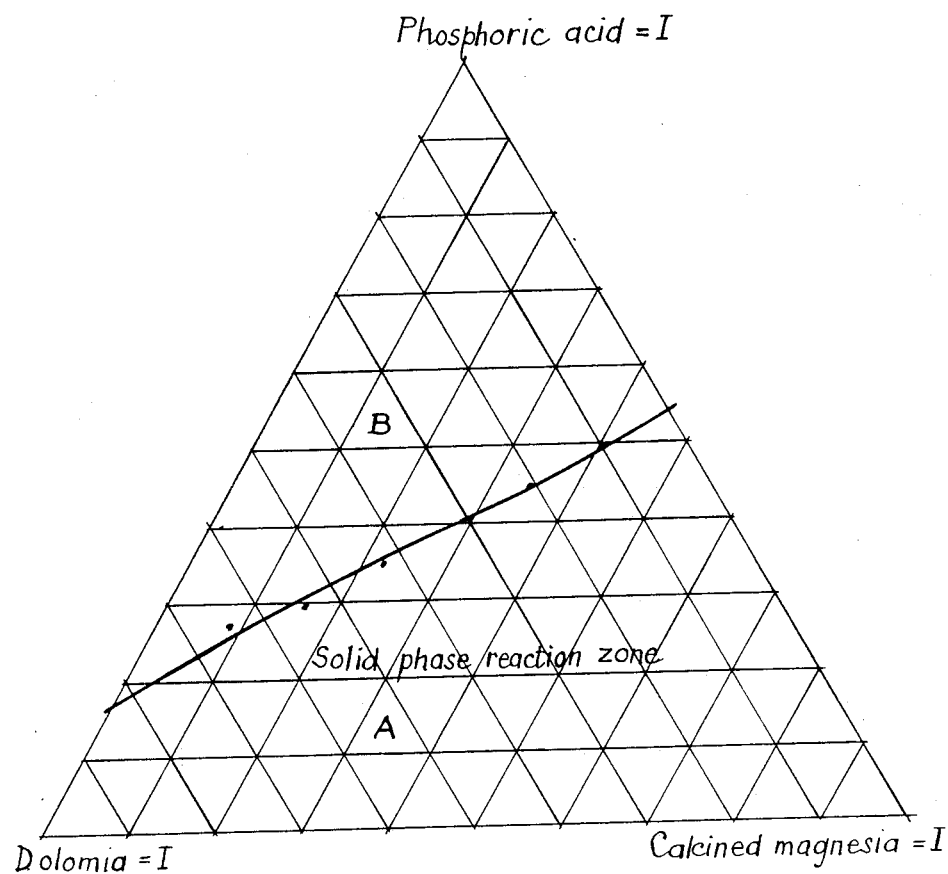
FIG. 2 shows the triangular diagram MgO, Dolomite, $H_3PO_4$. Zone "A" is that of the reactions which may be made in the apparatus according to the invention; in zone "B", the reactions cannot be envisaged.

It has been discovered that the triangular diagram (FIG. 2) made it possible to define a zone (A) where the reactions could be carried out by the process and in the apparatus according to the invention, and a zone (B) where this was impossible.

This diagram enabled the man skilled in the art to select without difficulty the proportions to be used for the various reagents.

The Table hereinafter shows the results of carrying out the reaction continuously in the apparatus according to the invention, as described in Example 1.

The speed of reaction may be considered as constant with respect to the incoming mass and close to 15 kg/min x m$^3$.

TABLE

| TEST OF ATTACK AND OF GRANULATION OF MAGNESIUM DERIVATIVES | | | | | | | | | | |
|---|---|---|---|---|---|---|---|---|---|---|
| % of the mass introduced | | | Results of analysis of the granulated products returned to 5% humidity | | | | | | | |
| Dolomite | Magnesia | $H_3PO_4$ | $P_2O_5$ tot | $P_2O_5$ SE | $P_2O_5$ SCN | CaO tot | MgO tot | MgO SE | MgO SCN | pH |
| 84.03 | 0 | 15.97 | 6.92 | 3.57 | 6.84 | 26.95 | 19.03 | 5.39 | 5.54 | 7.3 |
| 54.03 | 16.14 | 29.82 | 12.28 | 4.68 | 12.05 | 19.77 | 26.95 | 2.97 | 15.48 | 7.9 |
| 20.77 | 34.62 | 44.60 | 19.25 | 4.22 | 19.15 | 7.67 | 32.30 | 2.95 | 20.77 | 7.9 |
| 0 | 46.00 | 54.00 | 24.96 | 4.73 | 24.55 | 4.41 | 39.33 | 4.84 | 32.56 | 7.8 |
| 63.20 | 9.00 | 27.80 | 11.66 | 6.04 | 11.58 | 23.16 | 23.59 | 4.49 | 12.61 | 7.8 |
| 42.31 | 21.79 | 35.90 | 15.69 | 6.12 | 15.58 | 16.78 | 27.51 | 4.85 | 17.21 | 7.9 |
| 10.00 | 41.00 | 49.00 | 22.74 | 5.27 | 22.66 | 4.42 | 34.27 | 4.26 | 27.77 | 8.0 |

TABLE -continued

TEST OF ATTACK AND OF GRANULATION OF MAGNESIUM DERIVATIVES

| % of the mass introduced | | | Results of analysis of the granulated products returned to 5% humidity | | | | | | | |
|---|---|---|---|---|---|---|---|---|---|---|
| Dolomite | Magnesia | $H_3PO_4$ | $P_2O_5$ tot | $P_2O_5$ SE | $P_2O_5$ SCN | CaO tot | MgO tot | MgO SE | MgO SCN | pH |
| 30 | 30 | 40 | 17.97 | 5.35 | 17.82 | 14.35 | 33.58 | 4.23 | 23.44 | 8.0 |

Notes:
tot = total
SE = water soluble
SCN = soluble in neutral citrate

What is claimed is:

1. An apparatus for carrying out continuously and in dry phase an exothermic reaction involving liberation of gas, wherein the apparatus comprises:
   a reactor having a reaction chamber and an expansion chamber, the reaction chamber being disposed below the expansion chamber and being in communication therewith; the expansion chamber having a lower part and an upper part, the expansion chamber having an upper wall which forms a top wall for the reactor and the reaction chamber having a lower wall which forms a bottom wall for the reactor;
   a high-frequency mixer located within said reaction chamber at a lever intermediary between said bottom wall and the lower part of said expansion chamber, said mixer having projecting shears;
   first introducing means for introducing continuously at least one solid compound to be reacted into said reaction chamber at a lever above said mixer, so that the at least one solid compound is projected upwardly and atomized;
   second introducing means for introducing continuously at least one other reacting fluid into said reaction chamber at a level above said first introducing means and in close proximity to the lower part of said expansion chamber to produce in said reaction chamber at a level above said mixer an atomized solid reaction product and an evolved reaction gas;
   recovering means for recovering the solid reaction product at the bottom of said reaction chamber; and
   exhaust means for exhausting the evolved reaction gas in the vicinity of the upper wall of said expansion chamber.

2. An apparatus for carrying out continuously and in dry phase an exothermic reaction involving liberation of gas, wherein the apparatus comprises:
   a reactor having a reaction chamber and an expansion chamber, the reaction chamber being disposed below the expansion chamber and being in communication therewith; the expansion chamber having a lower part and an upper part, the expansion chamber having an upper wall which forms a top wall for the reactor and the reaction chamber having a lower wall which forms a bottom wall for the reactor;
   a high-efficiency mixer located within said reaction chamber at a level intermediary between said bottom wall and the lower part of said expansion chamber, said mixer having projecting shears;
   first introducing means for introducing continuously at least one solid compound to be reacted into said reaction chamber at a level above said mixer, so that the at least one solid compound is projected upwardly and atomized;
   second introducing means for introducing continuously at least one other reacting fluid into said reaction chamber at a level above said first introducing means and in close proximity to the lower part of said expansion chamber to produce in said reaction chamber at a level above said mixer a solid reaction product and an evolved reaction gas;
   recovering means for recovering the solid reaction product at the bottom of said reaction chamber;
   exhaust means for exhausting the evolved reaction gas in the vicinity of the upper wall of said expansion chamber; and
   diluting gas introducing means for introducing a diluting gas into said expansion chamber for mixing thereof with said evolved reaction gas.

3. The apparatus of claim 2, wherein said diluting gas introducing means comprises chamber means surrounding at least a portion of said expansion chamber and communicating therewith at the upper end thereof, said chamber means comprising diluting gas inlet means.

4. The apparatus of claim 3 further including means for introducing gaseous reagents beneath the shears in the mixer.

5. The apparatus of claim 3 wherein the expansion chamber is cylindrical and the surround chamber means is an annular chamber.

6. The apparatus of claim 2 further including heat exchanger means connected to said exhaust and means and to said diluting gas introducing means for preheating said diluting gas with heat from said evolved exhaust gas.

7. The apparatus of claim 6 further including a dust filter downstream of the heat exchange means and connected to the exhaust means for removing dust from the reaction gas.

8. The apparatus of claim 7 further including means for recovering the dust at the filter, said dust recovering means being connected to the means for continuouslsy introducing the starting products to the mixer for adding the dust to the starting products.

9. The apparatus of claim 7 further including means for recovering the dust at the filter said dust recovering means being connected to the means for recovering the finished product for adding the dust to the finished product.

10. An apparatus for carrying out continuously and in dry phase an exothermic reaction involving liberation of gas, wherein the apparatus comprises:
    a reaction having a reaction chamber and an expansion chamber, the reaction chamber being disposed below the expansion chamber and being in communication therewith; the expansion chamber having a lower part and an upper part, the expansion chamber having an upper wall which forms a top wall for the reactor and the reaction chamber having a lower wall which forms a bottom wall for the reactor;

a high-efficiency mixer located within said reaction chamber at a level intermediary between said bottom wall and the lower part of said expansion chamber, said mixer having projecting shears;

first introducing means for introducing continuously at least one solid compound to be reacted into said reaction chamber at a level above said mixer, so that the at least one solid compound is projected upwardly and atomized;

second introducing means for introducing continuously at least one other reacting fluid into said reaction chamber at a level above said first introducing means and in close proximity to the lower part of said expansion chamber to produce in said reaction chamber at a level above said mixer a solid reaction product and an evolved reaction gas;

third introducing means for introducing continuously at least one further reacting gas into said reaction chamber at a level below said mixer and in close proximity to the bottom part of said reactor;

recovering means for recovering the solid reaction product at the bottom of said reaction chamber; and exhaust means for exhausting the evolved reaction gas in the vicinity of the upper wall of said expansion chamber.

11. An apparatus for carrying out continuously in dry phase an exothermic reaction of a solid compound selected from the group consisting of calcinated MgO, $MgCO_3$ and Dolomite and another reacting compound selected from the group consisting of $H_3PO_4$ and $H_2SO_4$ to produce a magnesium compound, wherein the apparatus comprises:

a reactor having a reaction chamber and an expansion chamber, the reaction chamber being disposed below the expansion chamber and being in communication therewith; the expansion chamber having a lower part and an upper part, the expansion chamber having an upper wall which forms a top wall for the reactor and the reaction chamber having a lower wall which forms a bottom wall for the reactor;

a high-efficiency mixer located within said lower reaction chamber at a level intermediary between said bottom wall and the lower part of said expansion chamber, said mixer having projecting shears;

first introducing means for introducing continuously at least one solid compound to be reacted into said reaction chamber at a level above said mixer, so that said at least one solid compound is projected upwardly and atomized;

second introducing means, for introducing continuously least one other reacting fluid into said reaction chamber at a level above said first introducing means and in close proximity to the lower part of said expansion chamber to produce in said reaction chamber at a level above said mixer a solid reaction product and an evolved reaction gas;

recovering means for recovering the solid reaction product at the bottom of said reaction chamber;

exhaust means for exhausting the evolved reaction gas in the vicinity of the upper wall of said expansion chamber; and diluting gas introducing means for introducing a diluting gas into said expansion chamber for mixing thereof with the evolved reaction gas.

* * * * *

UNITED STATES PATENT AND TRADEMARK OFFICE
CERTIFICATE OF CORRECTION

PATENT NO. : 4,670,225

DATED : June 2, 1987

INVENTOR(S) : Christian Fayard et al

It is certified that error appears in the above-identified patent and that said Letters Patent is hereby corrected as shown below:

Column 9, Claim 1, Line 26:

reads: "chamber at a lever intermediary between said bot-"

should read: --chamber at a level intermediary between said bot- --

Column 9, Claim 1, Line 31:

reads: "reaction chamber at a lever above said mixer, so"

should read: --reaction chamber at a level above said mixer, so--

Signed and Sealed this

Twenty-second Day of September, 1987

Attest:

DONALD J. QUIGG

Attesting Officer     Commissioner of Patents and Trademarks